(12) United States Patent
Mallya

(10) Patent No.: US 7,649,849 B2
(45) Date of Patent: Jan. 19, 2010

(54) SYSTEMS AND METHODS FOR MEASURING TRANSPORT UTILIZATION

(75) Inventor: Arvind R. Mallya, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 226 days.

(21) Appl. No.: 11/708,416

(22) Filed: Feb. 20, 2007

(65) Prior Publication Data

US 2007/0140305 A1 Jun. 21, 2007

Related U.S. Application Data

(63) Continuation of application No. 10/319,216, filed on Dec. 13, 2002, now Pat. No. 7,221,685.

(51) Int. Cl.
*H04L 12/26* (2006.01)

(52) U.S. Cl. ...................... 370/252; 370/506

(58) Field of Classification Search ................. 370/472, 370/470, 468, 474, 535, 538, 505, 506, 358, 370/229, 235, 252, 391, 395.1, 537
See application file for complete search history.

(56) References Cited

U.S. PATENT DOCUMENTS

| | | | | |
|---|---|---|---|---|
| 5,650,825 | A * | 7/1997 | Naimpally et al. | 348/465 |
| 6,219,358 | B1 * | 4/2001 | Pinder et al. | 370/537 |
| 7,050,455 | B2 * | 5/2006 | Nishihara | 370/466 |
| 7,054,269 | B1 * | 5/2006 | Luguern et al. | 370/232 |

* cited by examiner

*Primary Examiner*—Brenda Pham
(74) *Attorney, Agent, or Firm*—Toler Law Group

(57) ABSTRACT

Systems and methods of measuring transport utilization are provided. A method may include receiving data regarding a number of stuff bits used to pad an unused portion of at least one frame. The at least one frame may have a fixed data payload. The method may also include determining a first transport utilization measurement based on the number of stuff bits and based on the size of the fixed data payload.

21 Claims, 3 Drawing Sheets

SYSTEMS AND METHODS FOR MEASURING TRANSPORT UTILIZATION

CROSS-REFERENCE TO RELATED APPLICATION(S)

This application is a Continuation patent application of and claims priority from U.S. patent application Ser. No. 10/319,216, filed on Dec. 13, 2002 and entitled "METHOD AND SYSTEM RELATING TO BANDWIDTH UTILIZATION," which is hereby incorporated by reference.

FIELD OF THE DISCLOSURE

The present disclosure relates generally to bandwidth utilization measurement.

BACKGROUND

Management and operation of a large scale distributed communication network has a high degree of complexity. To address the complexity of managing such distributed communication networks, many computer tools and other automated methods have been developed. As part of the network management process, various network management and equipment usage reports have been developed and routinely produced. For certain optical network high speed data communication equipment, measurement of traffic utilization on specific transport facilities is desirable. Conventional methods to determine such traffic utilization have involved intrusive techniques such as inserting probes or nonuser test data into the communication network to sample the optical or electrical facility capacity usage. It would be desirable to provide a useful network traffic utilization report without the disadvantages involved with such intrusive techniques.

Accordingly, there is a need for an improved system and method for determining data transport utilization.

SUMMARY

The present disclosure is generally directed to a system and method of measuring transport utilization of data that is to be multiplexed and transmitted over a digital transport facility. In a particular embodiment the method includes receiving at least one frame of a data channel at a time division multiplexing device, padding an unused portion of the frame with a number of stuff bits, determining a user traffic utilization measurement based on the number of stuff bits and based on the size of the data payload, and reporting the traffic utilization measurement. In this embodiment, the frame has a fixed data payload.

In another embodiment, a system that includes a data multiplexer is disclosed. The system includes the data multiplexer that has a plurality of inputs and a multiplexed output. The system also includes a digital facility that is coupled to the multiplexed output of the data multiplexer. The system further includes an element manager responsive to the data multiplexer. The element manager is to receive a user traffic measurement determined based on a number of stuff bits inserted into an unused portion of a data frame. In this embodiment, the data multiplexer includes a plurality of inputs to be multiplexed. At least one of the inputs is responsive to a user data frame of a time multiplexed channel. The user data frame has a fixed payload and includes user data traffic that is to be communicated and includes an unused portion that is padded with stuff bits.

In another embodiment, a communication system is disclosed. The communication system includes a data multiplexer having a plurality of inputs and a multiplexed output. At least one of the plurality of inputs is responsive to a user data frame within a data communication channel. The data communication channel is to be multiplexed with other data communication channels to produce a multiplexed output. The user data frame includes a fixed size data payload having a traffic portion that is used to handle communication of user data and an unused portion. The unused portion includes a number of stuff bits. The number of stuff bits is inversely proportional to the data communication utilization of the data communication channel.

In another embodiment, a communication network is disclosed. The communication network includes a first data multiplexing device and a second data multiplexing device. The first data multiplexing device has a plurality of inputs and a multiplex output where at least one of the plurality of inputs is responsive to a user data frame within a data communication channel. The data communication channel is to be multiplexed with other input data to produce the multiplexed output. The user data frame comprises a fixed size data payload having a traffic portion that is used to handle communication of user data and an unused portion. The unused portion includes a number of stuff bits where the number of stuff bits is inversely proportional to the data communication utilization of the data communication channel. The second data multiplexing device is remote from the first data multiplexing device and is responsive to receiving the multiplexed data communicated over a digital facility that couples the first and second data multiplexing devices. In a particular embodiment, the second data multiplexing device is a demultiplexer.

DETAILED DESCRIPTION OF THE FIGURES

Figure 1:
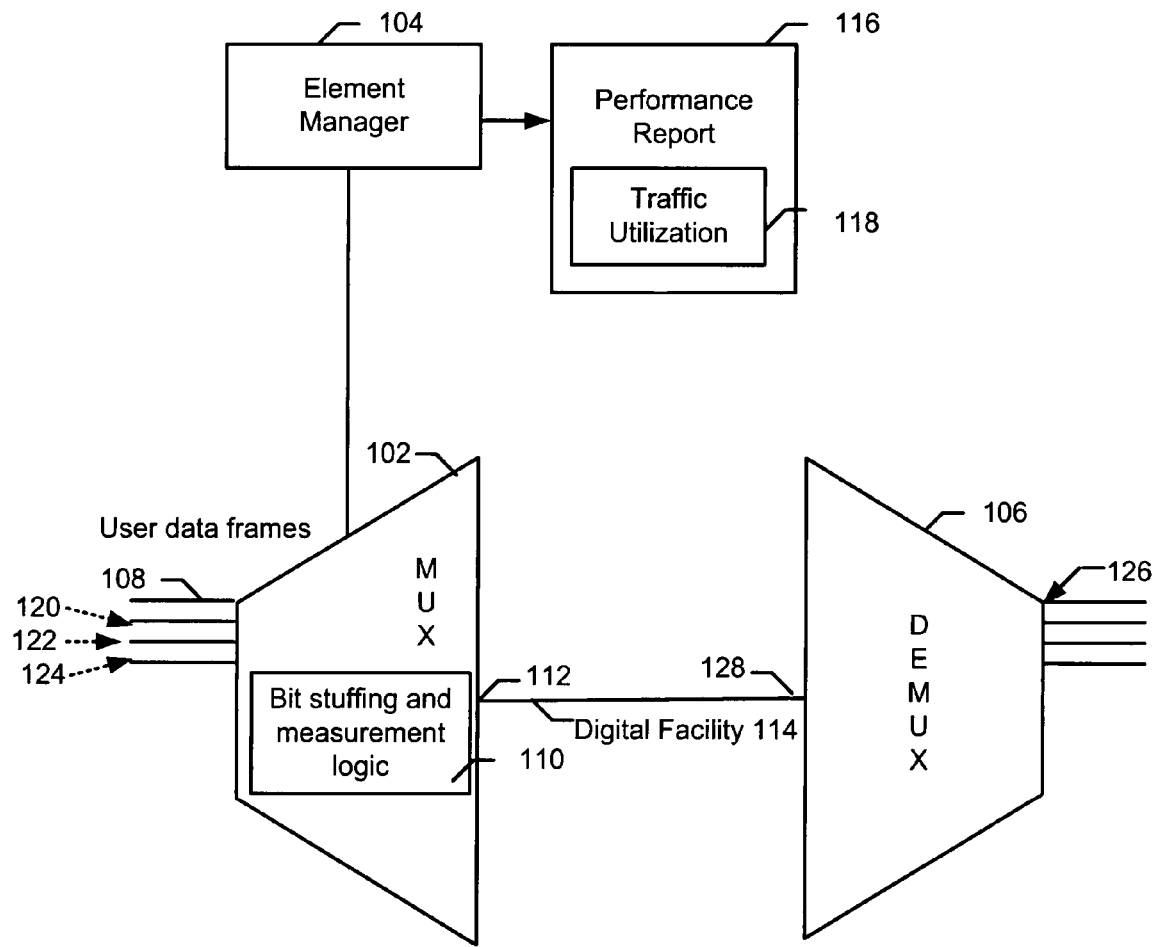
FIG. 1 is a block diagram that illustrates an embodiment of a system that includes a multiplexer with bit stuffing and measurement logic.

Referring to FIG. 1, a data communication system 100 is disclosed. The communication system 100 includes a data multiplexer 102, a digital facility 104, and a demultiplexer 106. The multiplexer 102 includes a plurality of input channels 108, 120, 122, and 124. The multiplexer 102 also includes digital bit-stuffing and measurement logic 110. The data multiplexer 102 has a multiplexer output 112 that is coupled to the digital communication transport facility 114. The communication system 100 also includes an element manager 104 that is coupled to the multiplexer 102. The element manager 104 provides an output performance report 116 that includes traffic utilization information 118. The element manager 104 may be implemented as a software module within a personal computer device. The performance report 116 may be a printed report or may be provided at a display device coupled to the element manger 104. The system 100 also includes a remote demultiplexer 106 coupled to a far end of the digital facility 114. The demultiplexer has a multiplexed input 128 and a plurality of demultiplexed output channels 126.

During operation, user data frames are received by the data multiplexer 102 from the input communication channels, such as a first input channel 108. The user data frames from the plurality of input channels are multiplexed to produce a multiplexed datastream at the multiplexer output 112. Where the input channels have unused data bandwidth, padding bits are stuffed into the available data frames so that the multiplexer output 112 has the appropriate fixed data payload size. The multiplexed output 112 carries a higher bandwidth, higher data speed communication signal than any of the individual input channels. The multiplexed data output signal is communicated over the digital facility 114 to the remote demultiplexer device 106. The demultiplexer 106 receives the multiplexed signal, demultiplexes the multiplex signal, to produce individual user data frames 126.

The element manager 104 receives communication measurement utilization information from the multiplexer 102. This information is derived from and determined by the number of unused padding bits that are stuffed into each of the user data frames to create the fixed payload multiplexed output signal. The element manager 104 receives the bit-stuffing and measurement information and produces an integrated traffic performance report 116 that includes the measured traffic utilization information disclosed as traffic utilization element 118. The traffic utilization information is conveniently provided to a network operator and includes capacity availability of each of the individual communication channels carried by the digital facility 114. In this manner, a user of the network may advantageously determine data communication capacity without the inconvenience of dedicated probe tests or other intrusive testing methods. An example of the digital facility 114 that is supported includes facilities such as DS1, DS3, VT1.5, STS-1, STS-3, and OC-3 facilities.

With the disclosed system 100, traffic utilization is measured using real-time calculation of bandwidth based on time division multiplex (TDM) frame stuff-bit information determined during the framing and multiplexing stage.

The disclosed system 100 takes advantage of the scenario where the user does not issue sufficient traffic to fill the allocated data payload of a particular frame. In this scenario, the data frame is padded with stuff bits so that the payload bytes are comprised of both user traffic and/or the stuff bits. By counting the stuff bits and subtracting the number of stuff bits from the fixed payload, the amount of traffic information can be discerned for each data frame. The stuff bits are arranged in a detectable binary pattern to facilitate detection and counting within the measurement logic 110. By aggregating the traffic over time intervals, whether for a single frame or for many frames over several minutes, the traffic utilization may be measured and reported. By reporting the traffic utilization, for example for each provisioned electrical or optical facility, the multiplexer 102 delivers to a network operator a useful measurement report 116 regarding traffic utilization. The disclosed system 100 may be used to monitor TDM and SONET interoffice facility (IOF) loop bandwidth usage on a real-time basis, both on the IOF loop and customer drops.

The bandwidth usage data that is reported may be used to assist network planners, marketing and sales personnel to better understand bandwidth and network bottlenecks and usage patterns to improve planning for future capacity needs. In addition, reported traffic statistics may be used to improve the network owner's ability to market communication services to customers that may be better informed of capacity exhaustive conditions. Additional information regarding traffic usage can also be provided to customers as an enhanced service so that customers may make appropriate decisions regarding their own bandwidth capacity and usage patterns.

Figure 2:
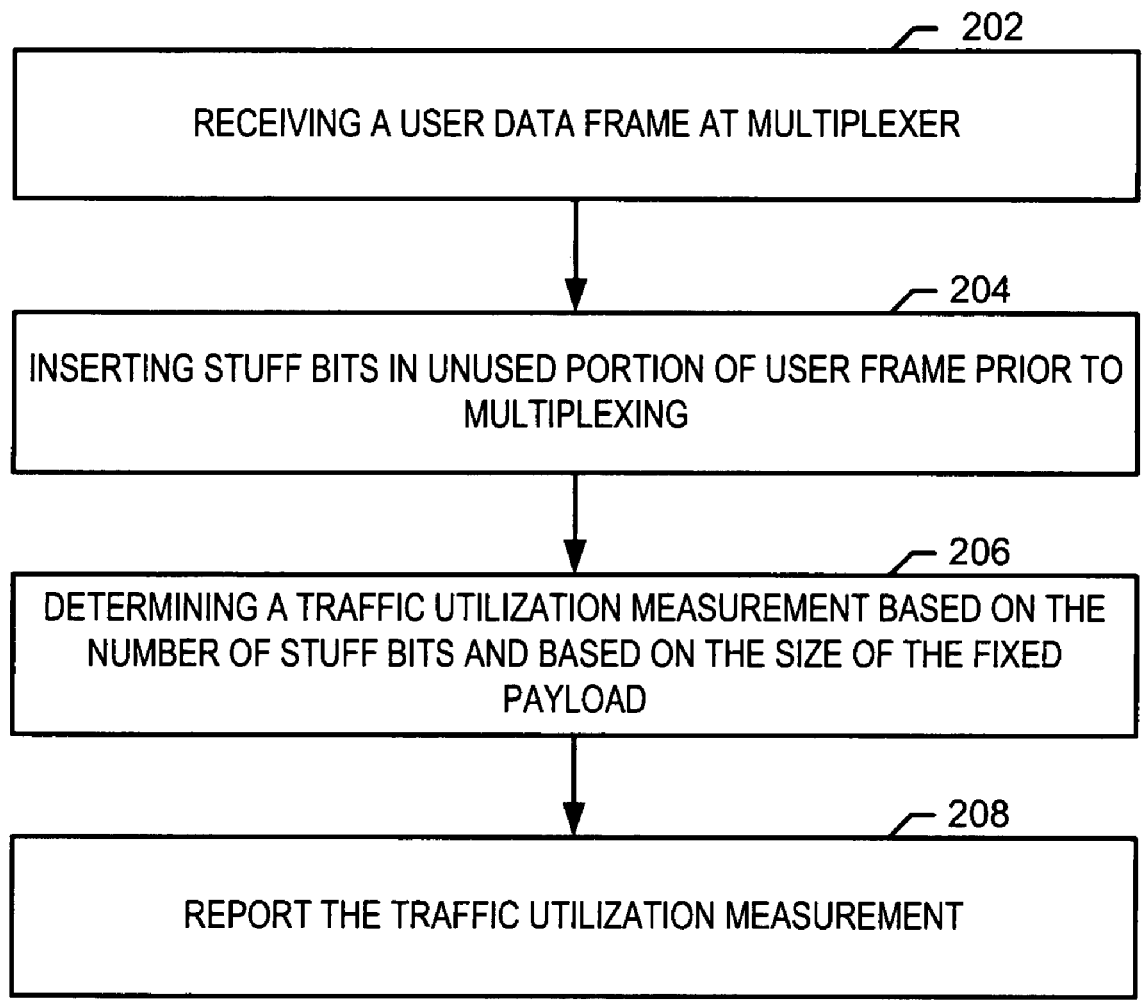
FIG. 2 is a flow chart that illustrates a method of determining traffic utilization of elements within a communication system.

Referring to FIG. 2, a method of measuring transport utilization of data to be multiplexed and transmitted over a digital transport facility is disclosed. The method includes a step of receiving a user data frame at the multiplexer, at 202. Padding stuff bits are then inserted into the unused portion of the user frame prior to multiplexing, at 204. A traffic utilization measurement is then determined based on the number of stuff bits and based on the size on the fixed payload, at 206. The traffic utilization measurement is then reported at 208.

Figure 3:
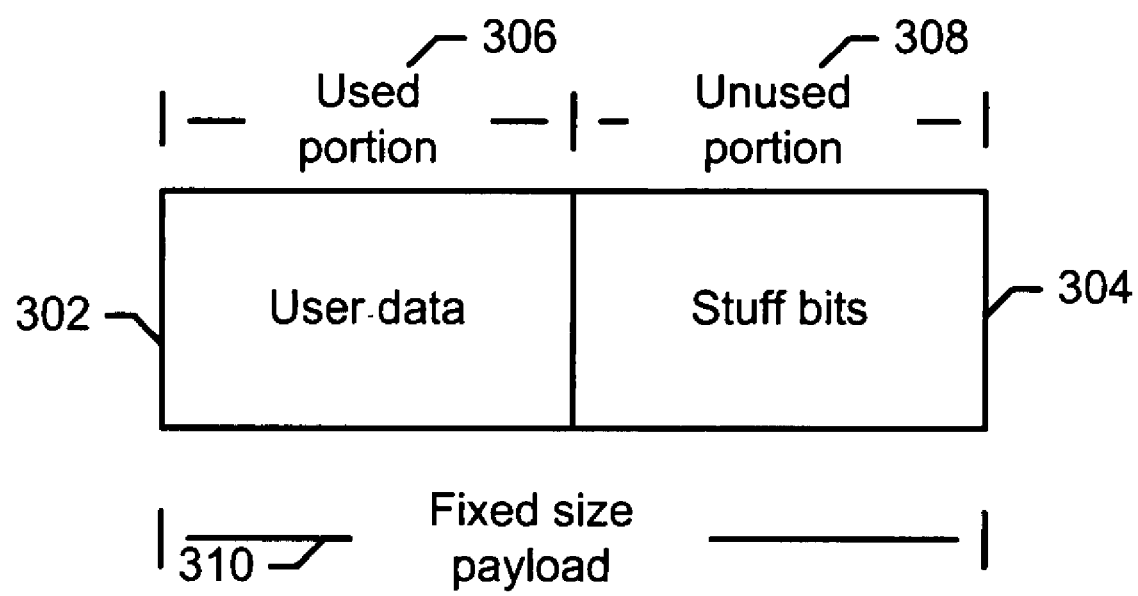
FIG. 3 is a general diagram that illustrates a portion of a data frame.

Referring to FIG. 3, a further detailed portion of a representative user frame, such as frame 108 is disclosed. The portion of the user frame includes a user data portion 302 and a stuff bit portion 304. The data frame 108 has a fixed size payload 310. In addition, for determining traffic measurement utilization, the user data frame has a used portion 306 and an unused portion 308. By comparing the number of stuff bits 304 in the unused portion 308 with respect to the size of the fixed payload 310, a determination may be made regarding utilization of the data frame. The portion of user data may be determined by subtracting the number of stuff bits 304 from the known fixed size of the payload 310.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A traffic management reporting device comprising:
   an input responsive to an element manager to receive a user traffic measurement retrieved from a first multiplexer by the element manager; and
   an output to provide a performance report, wherein the performance report includes at least one measurement based on the user traffic measurement retrieved from the first multiplexer by the element manager and capacity availability of at least one data channel carried by a digital facility between the first multiplexer and a second multiplexer based on the user traffic measurement.

2. The traffic management reporting device of claim 1, wherein the user traffic measurement is determined based on a number of stuff bits included in at least one user data frame by the multiplexer.

3. The traffic management reporting device of claim 2, wherein the at least one user data frame has a fixed payload, and wherein the at least one user data frame includes user data traffic to be communicated.

4. The traffic management reporting device of claim 2, wherein the stuff bits are arranged in a detectable pattern.

5. The traffic management reporting device of claim 2, wherein the number of stuff bits is inversely proportional to utilization of the at least one data channel.

6. A method of measuring transport utilization, the method comprising:
   receiving, at a traffic management reporting device, data regarding a number of stuff bits used to pad an unused portion of at least one frame by a first multiplexer, the at least one frame having a fixed data payload;
   determining, at the traffic management reporting device, a first transport utilization measurement based on the number of stuff bits and based on the size of the fixed data payload; and determining, at the traffic management reporting device, capacity availability of at least one data communication channel carried by a digital facility between the first multiplexer and a second multiplexer based on the number of stuff bits used to pad the unused portion of the at least one frame by the first multiplexer.

7. The method of claim 6, further comprising generating a report including the first transport utilization measurement.

8. The method of claim 6, wherein the first transport utilization measurement is associated with a first data communication channel, the method further comprising determining a second transport utilization measurement associated with a second data communication channel, and generating a report including the first transport utilization measurement and the second transport utilization measurement.

9. The method of claim 6, wherein the data regarding the number of stuff bits used to pad the unused portion of the at least one frame is received from the first multiplexer.

10. The method of claim 6, wherein the at least one frame is associated with a data communication channel with insufficient traffic to fill the fixed data payload.

11. The method of claim 6, wherein the at least one frame further comprises user data to be transported.

12. The method of claim 6, further comprising subtracting the number of stuff bits from a number of bits in the fixed data payload to measure the unused portion of the at least one frame.

13. The method of claim 6, wherein the data regarding the number of stuff bits used to pad the unused portion of the at least one frame is received at an element manager responsive to a time division multiplexing device.

14. A computer device, comprising
an element manager coupled to a first multiplexer, the element manager comprising a software module including instructions to:
receive data regarding a number of stuff bits used to pad an unused portion of at least one frame by the first multiplexer, the at least one frame having a fixed data payload;
determine a first transport utilization measurement based on the number of stuff bits and based on the size of the fixed data payload; and
determine capacity availability of at least one data communication channel carried by a digital facility between the first multiplexer and a second multiplexer based on the number of stuff bits used to pad the unused portion of the at least one frame by the first multiplexer.

15. The computer device of claim 14, wherein the software module further comprises instructions to generate a report including the first transport utilization measurement.

16. The computer device of claim 14, wherein the first transport utilization measurement is associated with a first data communication channel, and wherein the software module further comprises instructions to determine a second transport utilization measurement associated with a second data communication channel, and generating a report including the first transport utilization measurement and the second transport utilization measurement.

17. The computer device of claim 14, wherein the data regarding the number of stuff bits used to pad the unused portion of the at least one frame is received from the first multiplexer.

18. The computer device of claim 14, wherein the at least one frame is associated with a data communication channel with insufficient traffic to fill the fixed data payload.

19. The computer device of claim 14, wherein the at least one frame further comprises user data to be transported.

20. The computer device of claim 14, wherein the software module further comprises instructions to subtract the number of stuff bits from a number of bits in the fixed data payload to measure the unused portion of the at least one frame.

21. The computer device of claim 14, wherein the element manager is responsive to a time division multiplexing device.

\* \* \* \* \*